United States Patent Office 2,702,298
Patented Feb. 15, 1955

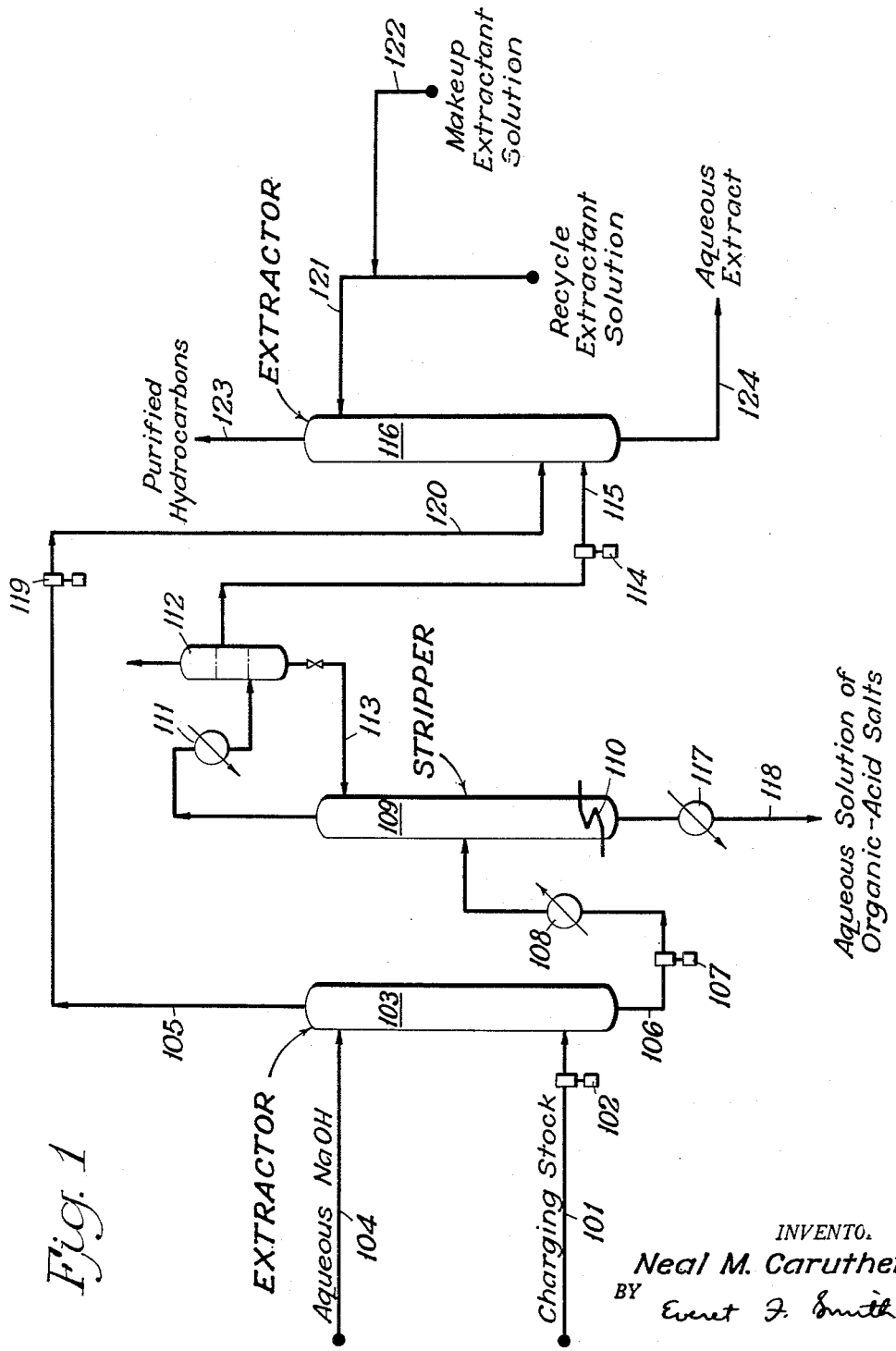

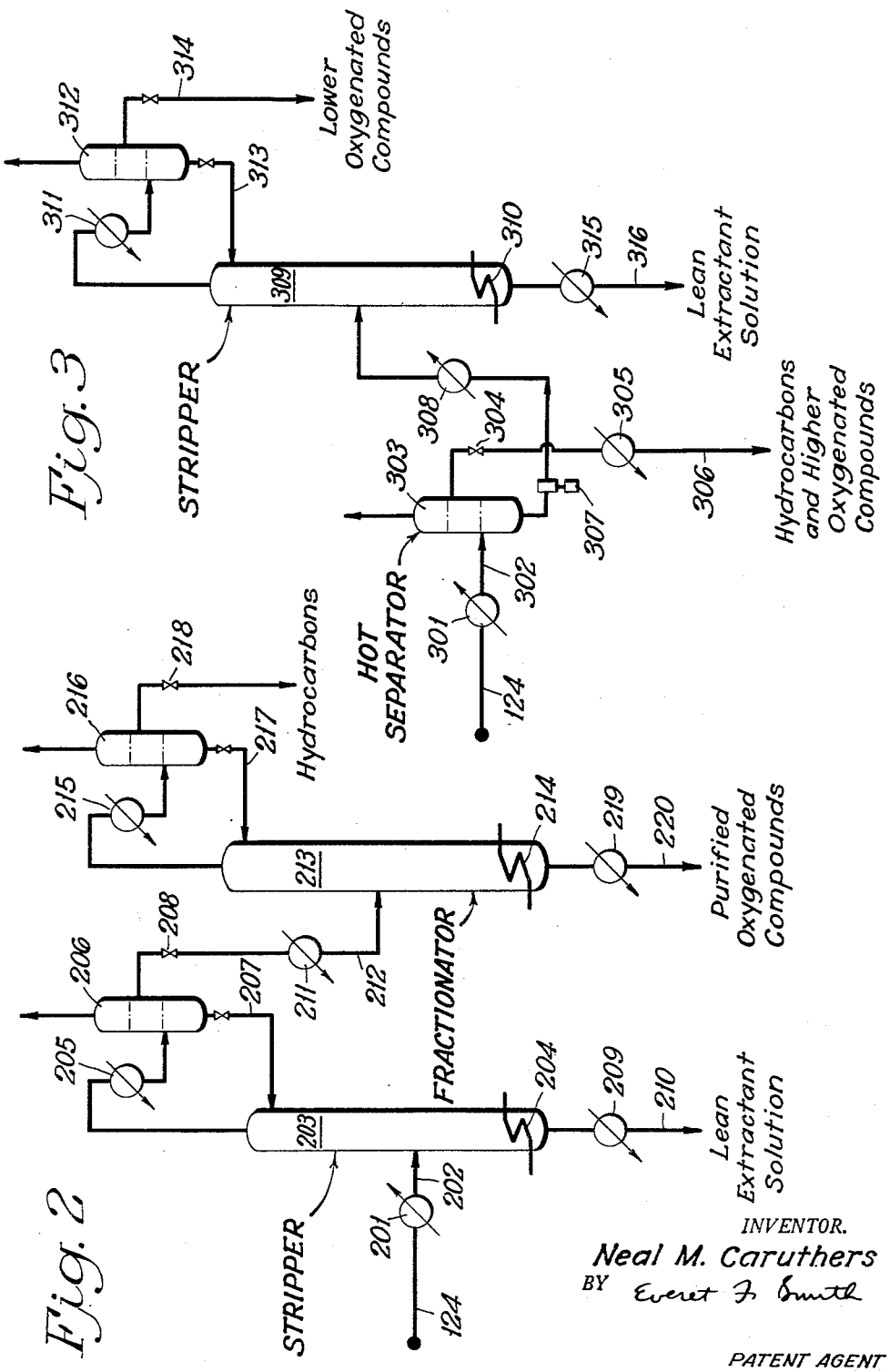

2,702,298

SEPARATION OF ORGANIC OXYGENATED COMPOUNDS FROM HYDROCARBONS

Neal M. Caruthers, Tulsa, Okla., assignor to Stanolind Oil and Gas Company, Tulsa, Okla., a corporation of Delaware Application December 31, 1949, Serial No. 136,230

8 Claims. (Cl. 260—450)

This invention relates to the separation of organic oxygenated compounds from mixtures thereof with hydrocarbons, and more particularly to a method for segregating, separating, and purifying alcohols, aldehydes, and/or ketones from hydrocarbon solutions thereof.

The major object of my invention is to separate preferentially oil-soluble organic oxygenated compounds from hydrocarbon solutions thereof in substantially purified condition, with a minimum of hydrocarbon contaminants. This object is achieved by contacting a hydrocarbon solution containing an alcohol, an aldehyde, and/or a ketone with an aqueous extractant solution comprising as the solubilizing constituent a water-soluble salt of an aliphatic monocarboxylic acid having from four to six carbon atoms in the molecule, and separating an aqueous extract containing the organic oxygenated compound or compounds substantially free from hydrocarbon contaminants other than those which can be removed therefrom by fractional distillation.

Another object of my invention is to effect the substantially complete removal of organic oxygenated compounds from solutions thereof in hydrocarbons, while obtaining said organic oxygenated compounds in purified form, relatively free from hydrocarbons. Other objects will be apparent from the following description.

The separation of preferentially oil-soluble organic oxygenated compounds such as alcohols, aldehydes, and ketones from hydrocarbon solutions thereof is a difficult problem, owing to the fact that the various constituents of such mixtures may have boiling points close to one another, and may form numerous association products and azeotropic mixtures. The problem, furthermore, has become of increasing importance in recent years, owing to the development of numerous processes which produce mixtures of hydrocarbons and organic oxygenated compounds, either as primary products, or as by-products, or as intermediate product fractions. The oxidation of normally liquid hydrocarbons is a familiar example of a process which produces a complex mixture of organic oxygenated compounds and hydrocarbons, including compounds in all the various stages of oxidation. Products of somewhat less complicated nature are produced by the Oxo process, in which an organic compound containing an olefinic double bond is reacted with carbon monoxide and hydrogen at an elevated temperature and pressure in the presence of an iron or cobalt catalyst; ordinarily, however, the resulting reaction product contains at least two aldehydes, the corresponding alcohols, unreacted charging stock, and small amounts of by-product ketones. The hydrogenation of carbon oxides, in particular carbon monoxide, tends to give products of greater or less complexity, depending upon the process conditions employed. The original Fischer-Tropsch process, employing a cobalt catalyst, gave a product containing predominantly hydrocarbons with little or no organic oxygenated compounds. However, the original "synthol" process, developed in Germany somewhat later than the Fischer-Tropsch process, produced substantial quantities of organic oxygenated compounds, in addition to hydrocarbons; and within comparatively recent years, the modern hydrocarbon synthesis process employing fluidized hydrogenation catalysts has been developed and adapted to the production of substantial quantities of organic oxygenated compounds by the utilization of alkali-promoted iron as the effective catalytic material. In a typical embodiment of the new process, an organic phase containing up to 40 percent or more of organic oxygenated compounds is produced under the following conditions:

| | |
|---|---|
| Catalyst | Iron. |
| Promoter | Potassium carbonate. |
| Promoter concentration | 0.5–2.0 percent by weight. |
| Temperature | 550–650° F. |
| Pressure | 100–500 lb./in.$^2$, gage. |
| Space velocity | 4–20 cubic feet of CO, measured at 60° F. and 1 atmosphere, per pound of iron per hour. |
| CO concentration in feed | 10–20 percent by volume. |
| H$_2$:CO ratio in total feed | 1.5–6. |

The product derived from such a process has been shown to be exceedingly complex, including a wide range of saturated and unsaturated hydrocarbons, from methane to high-melting waxes, and virtually the entire range of organic oxygenated compounds, from acetaldehyde, acetone, methanol, and acetic acid upward in molecular weight. The following organic oxygenated compounds, and others, have been identified in such reaction products: acetaldehyde, propionaldehyde, butyraldehyde, isobutyraldehyde, and higher aliphatic aldehydes; acetone, methyl ethyl ketone, methyl n-propyl ketone, methyl n-butyl ketone, and higher aliphatic ketones; cyclopentanone, methylcyclopentanones, and other alicyclic ketones; methanol, ethanol, n-propyl alcohol, isopropyl alcohol, n-butyl alcohol, isobutyl alcohol, 2-butanol, n-pentyl alcohol, 2-methyl-1-butanol, 3-methyl-1-butanol, n-octyl alcohol, and higher aliphatic alcohols; acetic acid, propionic acid, butyric acid, 2-methylbutyric acid, valeric acid, 3-methylvaleric acid, 2-methylhexanoic acid, caprylic acid, capric acid, myristic acid, palmitic acid, stearic acid, and other aliphatic carboxylic acids; esters derivable from the foregoing alcohols and acid, such as methyl acetate, ethyl acetate, ethyl butyrate, and the like; formals, acetals, and ketals derivable from the foregoing aldehydes, ketones, and alcohols; and phenol and higher phenols.

In the separation of organic oxygenated compounds such as alcohols, aldehydes, and ketones from hydrocarbon solutions by extraction with an aqueous solution of an organic-acid salt or soap, as practiced in the prior art, hydrocarbons in substantial quantity are simultaneously dissolved by the extractant solution. For example, when the organic phase obtained in the hydrogenation of carbon monoxide by the fluidized-iron process, described above, is extracted with an aqueous solution containing in excess of 30 percent by weight of sodium salts of the mixture of preferentially oil-soluble carboxylic acids, predominantly C$_4$ to C$_{11}$ alkanoic acids, produced by the hydrocarbon synthesis process, around 90 percent or more of the organic oxygenated compounds contained in the hydrocarbon solution may be removed; but the quantity of hydrocarbons simultaneously extracted may even be somewhat greater than the volume of extracted organic oxygenated compounds, and the extracted hydrocarbons have been found to have boiling points throughout the boiling-point range of the extracted organic oxygenated compounds. This is a serious disadvantage, since the further separation of hydrocarbons from the oxygenated compounds by known methods is very difficult.

I have now found that aqueous solutions of water-soluble salts of aliphatic monocarboxylic acids containing from four to six carbon atoms in the molecule have comparatively little affinity for hydrocarbons in general, and virtually no affinity for hydrocarbons boiling within the range of the preferentially oil-soluble organic oxygenated compounds. Hence, salts of this class may be used to extract organic oxygenated compounds from hydrocarbon solutions thereof with a minimum of hydrocarbon contaminants. I have further found that water-soluble salts of a mixture of aliphatic monocarboxylic acids within the C$_2$ to C$_6$ range, predominating in C$_4$ to C$_6$ acids, are superior with respect to their ability to solubilize organic oxygenated compounds, to reject hydrocarbons, to avoid emulsion formation, and to avoid foaming during the process of stripping organic oxygenated compounds from the rich aqueous extract.

The attached flowsheets illustrate a simple embodiment of my invention, in combination with various procedures for subsequent processing of the aqueous extract obtained therein. A charging stock comprising organic oxygenated compounds and hydrocarbons, suitably the organic phase resulting from the hydrogenation of carbon monoxide in the presence of a fluidized, alkali-promoted iron catalyst, as described above, is introduced by pump 101 (Figure 1) through line 102 into the bottom of extraction column 103, where it flows upward countercurrent to an aqueous alkaline solution, suitably an aqueous 10% solution of sodium hydroxide, introduced into the top of the column through line 104. The quantity of free alkali introduced into the column should preferably be equal to or slightly in excess of the amount necessary to extract substantially all of the organic acids from the charging stock. The resulting acid-free charging stock emerges overhead through line 105, and is further processed as described below, to remove other organic oxygenated compounds therefrom.

Through line 106 at the bottom of extractor 103 emerges an aqueous solution of sodium salts of the mixture of organic acids contained in the charging stock, together with a quantity of other organic oxygenated compounds, solubilized by the organic-acid salts. This aqueous solution is transferred by pump 107 through heater 108 into an intermediate section of stripper column 109, equipped with reboiler 110, where the solubilized organic oxygenated compounds, other than the organic-acid salts, are stripped out and removed overhead through condenser 111 into decanter 112, where stratification takes place. The aqueous phase in the decanter is refluxed by valved line 113 to the top of stripper column 109. The organic phase in decanter 112, comprising organic oxygenated compounds and hydrocarbons, is removed by pump 114 and fed through line 115 into a lower section of extractor column 116 for further processing, described below. From the bottom of stripper column 109 emerges a purified aqueous solution of organic-acid salts. This solution flows through cooler 117 and is withdrawn through line 118 for recovery of the organic-acid salts and/or the organic-acid constituents thereof by conventional methods.

The acid-free mixture of hydrocarbons and organic oxygenated compounds in line 105 is transferred by pump 119 through line 120 into a lower point of extraction column 116, preferably above the entry point of line 115, where it flows upward countercurrent to the aqueous extractant solution of my invention, introduced into the top of the column through line 121. Makeup extractant solution is supplied as required through lines 122 and 121. The active solubilizer constituents of the extractant solution are sodium salts of aliphatic monocarboxylic acids containing from four to six carbon atoms in the molecule. For maximum extraction of organic oxygenated compounds, the extractant solution should contain above about 30 percent by weight of solubilizer salts, but for optimum hydrocarbon rejection, the concentration of solubilizer salts should be restricted to less than about 50 percent. The temperature within extraction column 116 is preferably between about 30 and 60° C. The aqueous extractant solution selectively dissolves the organic oxygenated compounds from the hydrocarbon stream, with little or none of the hydrocarbons boiling in the same range; and the hydrocarbon raffinate, containing a greatly diminished proportion of organic oxygenated compounds, emerges from the top of extraction column 116 and is withdrawn through line 123 for further processing.

An aqueous extract containing the organic oxygenated compounds flows out of the bottom of extraction column 116 through line 124. This extract ordinarily contains a quantity of entrained hydrocarbons, which should preferably be removed by settling, centrifuging, or the like (apparatus not shown) before the extract is further treated to recover the dissolved organic oxygenated compounds therefrom.

The aqueous extract in line 124 (Figure 1) may subsequently be led through heater 201 (Figure 2) and line 202 into an intermediate section of stripper column 203, equipped with reboiler 204. Therein, substantially all of the dissolved organic materials, other than the solubilizer salts, are stripped out and are passed overhead through condenser 205 into decanter 206, where phase separation takes place. The aqueous phase in decanter 206 is refluxed through valved line 207 to the top of column 203. The organic phase in decanter 206, consisting of organic oxygenated compounds, hydrocarbons, and water, is withdrawn through valved line 208 for further processing, described below. The lean aqueous extractant solution emerging from the bottom of column 203 flows through cooler 209 and line 210, and may be recycled through line 121 to the top of extractor column 116.

The organic materials from decanter 206 flow through valved line 208, heater 211, and line 212 into an intermediate section of fractionating column 213, equipped with reboiler 214. Fractional distillation is carried out therein, and an overhead fraction boiling up to about 95 to 97° C. is withdrawn overhead through condenser 215 into decanter 216, where a small quantity of aqueous phase ordinarily stratifies. The aqueous phase in decanter 216, together with any organic phase necessary for maintaining a sufficient reflux ratio, is recycled through valved line 217 to the top of fractionator 213. The organic phase in decanter 216 is withdrawn through valved line 218, and may be further processed by recycle to the primary product separator of the hydrocarbon synthesis process, or by recycle in part through line 120 to extractor 116. A purified stream of organic oxygenated compounds, substantially free from dissolved hydrocarbons, emerges from the bottom of column 213 through cooler 219, and may be withdrawn through line 220 for further processing.

Alternatively, the aqueous extract in line 124 (Figure 1) may be led through heater 301 (Figure 3) and line 302 into hot separator 303, where it is subjected to a temperature from 10 to 25° C. or more above the temperature in extraction column 116. The higher organic oxygenated compounds are thereby caused to stratify, together with the greater portion of any hydrocarbon contaminants, and the resulting organic phase is withdrawn through valved line 304, cooler 305, and line 306 for further processing to separate the individual constituents thereof.

The aqueous phase from hot separator 303 is transferred by pump 307 through heater 308 into an intermediate section of stripper column 309, equipped with reboiler 310. Therein, the remainder of the organic oxygenated compounds, consisting predominantly of the lower-molecular-weight types thereof, are stripped out and taken overhead through condenser 311 into decanter 312, where stratification takes place. The aqueous phase therein is refluxed through valved line 313 to the top of column 309, and the organic phase is withdrawn through valved line 314 for further processing. The lean aqueous extractant solution flowing out of the bottom of stripper column 309 passes through cooler 315 and line 316 and may be recycled through line 121 to the top of extraction column 116.

Numerous process modifications may be made in applying my invention to the problem of separating preferentially oil-soluble organic oxygenated compounds from hydrocarbons. For example, in carrying out the extraction of the charging stock in column 116, as set forth in Figure 1, and the description thereof, I may back-wash the extract reaching the bottom of the column with a light hydrocarbon such as propane, butane, pentane, hexane, heptane, cyclohexane, benzene, and the like, or a low-boiling fraction of the oil stream charging stock itself, in order to reduce the concentration of higher-boiling hydrocarbons in the aqueous extract emerging from the bottom of the column. As another example, I may carry out the extraction of organic acids and organic oxygenated compounds simultaneously from hydrocarbons by incorporating free sodium hydroxide or other alkaline material in the extractant solution entering column 116. In another modification of my invention, I may introduce a relatively concentrated extractant solution, for example containing from 50 to 60 percent by weight of solubilizer salt or above, into the top of extraction column 116, and thereafter progressively dilute the extractant solution by stepwise injection of water into the column at spaced points. This alternative has the advantage that the relatively concentrated extractant solution with which the charging stock is last contacted before leaving the column has the power to remove substantially all organic oxygenated compounds therefrom, while the progressive dilution of the extractant solution as it passes downward through the column tends to release solubilized hydrocarbons, so that when the extract emerges from the bottom of the column, preferably at a solubilizer concentration around 30 percent by weight or somewhat lower, it contains a minimum of hydrocarbon contaminants.

In a further modification, I may contact the charging stock with an aqueous extractant solution containing my improved type of solubilizer; and I may thereafter contact the resulting hydrocarbon raffinate with an aqueous extractant solution containing salts of a broad range of preferentially oil-soluble carboxylic acids preferably having less than twelve carbon atoms in the molecule, and preferably at a concentration above about 30 percent by weight of said salts, in order to effect the substantially complete removal of organic oxygenated compounds remaining therein. The second extract may thereafter be stripped to remove organic oxygenated compounds therefrom, which may then be recycled to the original charging stock, or may be contacted separately with an aqueous extractant solution containing my improved range of solubilizer salts.

In an especially advantageous modification of my process, I may first contact the charging stock with an aqueous extractant solution containing salts of a wide range of preferentially oil-soluble aliphatic carboxylic acids predominantly having less than twelve carbon atoms in the molecule, and preferably at a concentration above about 30 percent by weight of said salts. Such extractant solutions are capable of removing all but a small proportion of the organic oxygenated compounds originally present in the charging stock. The resulting solubilized material, containing a high proportion of hydrocarbon contaminants, is then separated from the aqueous extract by suitable means, such as by steam distillation. Thereafter, the materials separated from the initial extract are contacted with an aqueous extractant solution containing my preferred class of solubilizer salts. In this way, an aqueous extract is obtained containing organic oxygenated compounds with a minimum of hydrocarbon contaminants. The advantages of this modification of my process are that it achieves virtually complete removal of organic oxygenated compounds from the charging stock in only one step, and also produces a highly purified organic oxygenated compound product.

The solubilizer salt or salts used in the aqueous extractant solution of my process may be any water-soluble salt of an aliphatic monocarboxylic acid containing from four to six carbon atoms in the molecule. The cation constituent thereof, however, should preferably be an alkali metal, for example sodium or potassium; or it may be ammonium or a substituted ammonium, such as methylammonium, diethylammonium, diethanolammonium, trimethylammonium, triethanolammonium, tetramethylammonium, and the like. Among my new class of salts are the butyrates, isobutyrates, crotonates, isocrotonates, valerates, isovalerates, 2-methylbutanoates, 2-methyl-2-penteneoates, 1-hexanoates, 4-methyl-1-hexanoates, and the like, of the class of cations set forth above. Of the foregoing salts, I prefer to use those derived from straight-chain acids.

My solubilizer salts may be used singly, or as mixtures of members of the defined group wherein the acid constituents have an average molecular weight between about 85 and 116, preferably between about 95 and 105. They may also be used, singly or as mixtures, in combination with other salts wherein the ratio of carbon atoms per carboxyl group in said other salts is less than four. The inclusion of such other salts in the solubilizer composition has the decided advantage of suppressing the formation of emulsions with the hydrocarbon charging stock and of minimizing foaming when the rich aqueous extract is steam distilled to strip the dissolved hydrocarbons and organic oxygenated compounds therefrom. The solubilizer composition should not, however, contain any large proportion (maximally, about ten percent by weight) of aliphatic monocarboxylic acid salts containing over six carbon atoms in the molecule.

The solubilizer salts used in my process may be obtained in a variety of ways. They may be prepared, for example, by neutralizing individual carboxylic acids of the defined group, or mixtures thereof, with a suitable compound of the desired cation. Alternatively, a mixture of carboxylic acids, such as may be separated from the products obtained by the hydrogenation of carbon monoxide, by the oxidation of hydrocarbons, by the oxidation of mixed aldehydes, by treatment of mixed alcohols with sodium followed by hydration, and the like, may be fractionally distilled and a fraction thereof containing the desired range of acids may thereafter be converted into the desired salts. For example, a fraction of mixed alkanoic acids boiling between about 150 and 210° C. contains the acids from which my preferred range of solubilizer salts may be prepared. In a highly advantageous alternative method, an oil phase obtained in the hydrogenation of carbon monoxide in the presence of an alkali-promoted iron catalyst may be fractionally distilled to separate therefrom a fraction containing the desired range of alkanoic acids, and the separated fraction may then be contacted with an aqueous alkaline solution, for example aqueous sodium hydroxide, to extract the alkanoic acids therefrom, while simultaneously converting them into the desired salts in aqueous solution. In all of these alternative procedures, it will be apparent that numerous modifications may be made within the skill of the art.

An especially effective and advantageous solubilizer consists of a mixture of salts of the below-$C_7$ aliphatic carboxylic acids existing in the hydrocarbon phase obtained by the hydrogenation of carbon monoxide in the presence of a fluidized, alkali-promoted iron catalyst. This solubilizer mixture may conveniently be obtained by extracting all the acids from the said hydrocarbon phase with aqueous caustic soda, expelling dissolved volatile impurities from the resulting aqueous extract by steam stripping, acidifying with sulfuric acid or other mineral acid, separating the organic-acid phase liberated thereby, fractionally distilling and withdrawing a distillate fraction boiling up to about 210° C., and converting the withdrawn fraction into the desired solubilizer salts by neutralization with, for example, sodium hydroxide. A solubilizer mixture obtained in this way was found to have the following acid distribution:

| | Weight per cent |
|---|---|
| Propionic | 1.8 |
| Isobutyric | 3.1 |
| n-Butyric | 14.0 |
| Pentanoic, branched | 19.7 |
| n-Pentanoic | 24.1 |
| Hexanoic, branched | 14.1 |
| n-Hexanoic | 16.9 |
| Heptanoic, branched | 5.6 |

The striking advantages of my invention over the prior art may be obtained with aqueous extractant solutions of substantially any concentration. For most effective extraction of organic oxygenated compounds from hydrocarbons, the extractant solution should contain in excess of 30 percent by weight of solubilizer salts, for example from 30 to 60 percent. Concentrations of solubilizer salts above 60 percent by weight may be used, provided that the conditions of temperature and other process variables within the extraction zone are such that the extractant solution is maintained in the liquid phase. When, on the other hand, the minimization of hydrocarbon contaminants in the aqueous extract is the major consideration, the aqueous extractant solution should then contain less than around 50 percent by weight of solubilizer salts. Thus, the preferred range of solubilizer concentration lies between about 30 and 50 percent by weight. It is to be understood, however, that my invention is not limited to such range, since the advantages thereof over the results obtained in the prior art are obtained at any comparable solubilizer concentration.

The extraction temperature in my new process is in general not a critical operating variable, and may satisfactorily lie within the range of about 0 to 100° C. The extraction efficiency tends to decrease at higher temperatures within this range; ordinarily, therefore, I prefer to operate within the range of about 20 to 80° C., and optimally between about 30 and 60° C. Ordinary or autogenous pressures may be used. Where elevated temperatures are employed, the extraction zone should preferably be maintained at a sufficiently high pressure to prevent loss of process materials by volatilization and to prevent disturbances within the extraction zone resulting from ebullition therein.

The aqueous extract obtained in my process, containing solubilizer salts, organic oxygenated compounds, and ordinarily a small proportion of hydrocarbons, may subsequently be further treated in a variety of ways. For example, I may exhaustively strip the aqueous extract with a hot gasiform stream, preferably steam, to remove substantially all organic constituents other than the solubilizer salts. The liberated organic oxygenated compounds may thereafter be fractionally distilled to separate a first fraction heavily contaminated with hydrocarbons, and subsequent fractions containing little or no hydrocarbons. The contaminated fraction may conveniently be recycled to an earlier step in the process. As another alternative, I may extract the organic oxygenated compounds from the aqueous extract with a suitable solvent, such as an aliphatic ether, an ester, or the like, chosen in accordance with its physical and chemical properties so that it can conveniently be separated by conventional means, such as fractional distillation, from the organic oxygenated compounds dissolved thereby.

The following specific examples will more fully illustrate my invention:

*Example I*

The following tests on the extraction of organic oxygenated compounds from hydrocarbon solutions with aqueous solutions of water-soluble carboxylic-acid salts demonstrate the striking superiority of a mixture of $C_2$–$C_6$ salts with respect to the minimization of hydrocarbon contamination in the resulting extract.

All of the experiments were carried out with a hydrocarbon solution of organic oxygenated compounds obtained by the hydrogenation of carbon monoxide in the presence of a fluidized, alkali-promoted iron catalyst, as described more fully above. The hydrocarbon solution was first washed free of acids with an aqueous solution of sodium hydroxide. The resulting aqueous solution of sodium carboxylic-acid salts was steam-stripped free of hydrocarbons and organic oxygenated compounds other than the salts themselves, and the stripped hydrocarbons and organic oxygenated compounds were returned to the caustic-washed hydrocarbon solution. The caustic-washed hydrocarbon solution was analyzed and was found to contain 0.46 mole of carbonyl compounds per liter and 0.9 mole of alcohols per liter.

A portion of the steam-stripped aqueous salt solution was then treated with sulfuric acid to liberate the organic acids, and the liberated organic acids were separated by fractional distillation into three fractions: the $C_2$–$C_6$ acids, the $C_7$ and $C_8$ acids, and $C_8$ and higher acids. These fractions were converted into the sodium salts, and separate aqueous 40 percent by weight solutions thereof were prepared for use as extractant solutions in treating the caustic-washed hydrocarbon solution.

Another portion of the steam-stripped aqueous solution of carboxylic-acid salts, obtained in the caustic-washing of the original hydrocarbon solution, was concentrated to give an aqueous extractant solution containing 40 percent by weight of sodium salts of the total mixture of carboxylic acids.

A series of extractions was then carried out with each of the four extractant solutions described above. In each series, a three liter portion of the caustic-washed hydrocarbon solution was repeatedly contacted at around 30° C. with a 500-milliliter portion of one of the extractant solutions. After each contact, the phases were separated, the aqueous extract phase was steam-stripped, the organic material stripped therefrom was analyzed, and the raffinate phase was again contacted with the stripped aqueous phase.

The results were as follows:

EXTRACTED ORGANIC MATERIAL, CUMULATIVE VOLUME PERCENT OF OIL CHARGE

| Extraction No. | $C_2$–$C_6$ | $C_7$ and $C_8$ | $C_8$ and Higher | Total Salts |
|---|---|---|---|---|
| 1 | 2.0 | 4.1 | 9.5 | 4.1 |
| 2 | 3.4 | 6.6 | | 6.5 |
| 3 | 4.4 | 8.2 | | 8.1 |
| 4 | 5.1 | 9.2 | | 9.2 |
| 5 | 5.7 | | | 10.0 |
| 6 | 6.0 | | | 10.6 |
| 7 | 6.3 | | | 11.2 |
| 8 | 6.5 | | | 11.6 |

CARBONYL COMPOUNDS IN EXTRACTED ORGANIC MATERIAL, CUMULATIVE MOLE PERCENT OF CARBONYL COMPOUNDS IN CHARGING STOCK

| | | | | |
|---|---|---|---|---|
| 1 | 5.1 | 8.7 | 15.9 | 8.0 |
| 2 | 9.4 | 15.9 | | 14.5 |
| 3 | 13.0 | 21.7 | | 18.8 |
| 4 | 15.9 | 26.1 | | 21.7 |

ALCOHOLS IN EXTRACTED ORGANIC MATERIAL, CUMULATIVE MOLE PERCENT OF ALCOHOLS IN CHARGING STOCK

| | | | | |
|---|---|---|---|---|
| 1 | 24.9 | 37.9 | 41.2 | 37.3 |
| 2 | 42.4 | 58.8 | | 57.6 |
| 3 | 52.5 | 68.9 | | 68.9 |
| 4 | 59.3 | 75.1 | | 75.7 |
| 5 | 64.4 | | | 79.7 |
| 6 | 67.2 | | | 81.9 |
| 7 | 70.1 | | | 83.6 |
| 8 | 72.3 | | | 84.3 |

HYDROCARBONS IN EXTRACTED ORGANIC MATERIAL, CUMULATIVE VOLUME PERCENT

| | | | | |
|---|---|---|---|---|
| 1 | 1 | 21 | 57 | 28 |
| 2 | 1 | 23 | | 28 |
| 3 | 2 | 22 | | 27 |
| 4 | 2 | 23 | | 27 |
| 5 | 2 | | | 27 |
| 6 | 2 | | | 28 |
| 7 | 2 | | | 28 |
| 8 | 2 | | | 29 |

*Example II*

A hydrocarbon phase obtained by hydrogenating carbon monoxide in the presence of a fluidized, alkali-promoted iron catalyst was washed with aqueous sodium hydroxide to remove organic acids therefrom. The resulting aqueous solution of organic-acid salts was steam-distilled free from other organic materials, and was thereafter evaporated to a salt concentration of 45 percent by weight. The organic materials recovered thereby were returned to the washed hydrocarbon phase, and the resulting acid-free mixture of hydrocarbons and organic oxygenated compounds was thereafter extracted with the aqueous 45 percent salt solution. The aqueous extract was subsequently exhaustively steam-distilled to remove solubilized organic oxygenated compounds and hydrocarbons therefrom. The organic distillate obtained thereby was a mixture of oil-soluble alcohols, aldehydes, and ketones containing 38 percent by weight of hydrocarbons.

Three identical 209-gram portions of said organic distillate were thereafter contacted separately at room temperature with an equal volume of water, an aqueous 25 weight-percent sodium acetate solution, and an aqueous 25 weight-percent sodium valerate solution. The phases were separated, and the aqueous extract phases were steam-distilled to remove the solubilized organic oxygenated compounds and hydrocarbons therefrom. The results were as follows:

| | Alcohols, g.-moles | Carbonyl Compounds, g.-moles | Hydrocarbons, grams |
|---|---|---|---|
| Organic distillate | 0.690 | 0.409 | 77 |
| Water extract | 0.054 | 0.036 | 0 |
| Sodium acetate extract | 0.029 | 0.020 | 0 |
| Sodium valerate extract | 0.135 | 0.047 | 0 |

*Example III*

Two extractions each were made on portions of a neutralized synthetic hydrocarbon mixture with a series of aqueous extractant solutions, each of which contained 25 weight-percent of salts of a single $C_4$, $C_5$, $C_6$, $C_7$, $C_8$, and $C_9$ aliphatic carboxylic-acid fraction. The synthetic hydrocarbon mixture was obtained by hydrogenating carbon monoxide in the presence of a fluidized, alkali-promoted iron catalyst, and contained 0.53 mole per liter of alcohols, 0.51 mole per liter of carbonyl compounds, and 85 volume-percent of hydrocarbons. The carboxylic acids used in the preparation of the extractant solutions were obtained by fractionation of the acids originally present in the synthetic hydrocarbon mixture. All extractions were carried out at 38° C. and at a 4 to 1 volume ratio of hydrocarbon mixture to extractant solution. The results were as follows:

| Solubilizer Salt | Hydrocarbon Mixture, ml. | Total Extracted Material | | | | Total Recovery | |
|---|---|---|---|---|---|---|---|
| | | Vol., ml. | Alcohols, moles | Carbonyls, moles | Hydrocarbons, vol.-percent | Alcohols, mole-percent | Carbonyls, mole-percent |
| $C_4$ | 4,000 | 19 | 0.12 | 0.04 | 0.0 | 5.6 | 2.0 |
| $C_5$ | 4,000 | 46 | 0.27 | 0.09 | 7.0 | 12.7 | 4.4 |
| $C_6$ | 4,000 | 107 | 0.57 | 0.16 | 16.0 | 26.9 | 7.8 |
| $C_7$ | 4,000 | 155 | 0.73 | 0.21 | 23.5 | 34.4 | 10.3 |
| $C_8$ | 3,400 | 174 | 0.65 | 0.22 | 34.5 | 36.1 | 12.7 |
| $C_9$ | 2,000 | 106 | 0.37 | 0.13 | 36.0 | 34.9 | 12.7 |

Example IV

An aqueous 44 weight-percent solution of sodium butyrate (substantially saturated at room temperature) was used to extract oil-soluble organic oxygenated compounds from the hydrocarbon solution thereof, obtained by hydrogenating carbon monoxide in the presence of a fluidized, alkali-promoted iron catalyst, containing 0.67 mole per liter of alcohols, 0.43 mole per liter of carbonyl compounds, and 85 volume-percent of hydrocarbons. In the first extraction, four liters of the charging stock were contacted at 38° C. with one liter of the extractant solution. The resulting aqueous extract was exhaustively steam-stripped and the organic distillate was collected and analyzed. Thereafter, the exhausted aqueous solution was readjusted to a salt concentration of 44 weight-percent, and was employed to reextract the raffinate from the previous extraction. A total of ten extractions were carried out according to this procedure. The results were as follows:

| Extraction No. | Cumulative Extracted Material | | | | Cumulative Recovery | |
|---|---|---|---|---|---|---|
| | Volume, ml. | Alcohols, moles | Carbonyls, moles | Hydrocarbons, vol.-percent | Alcohols, mole-percent | Carbonyls, mole-percent |
| 1 | 100 | 0.60 | 0.09 | 12.0 | 22.4 | 5.2 |
| 2 | 177 | 1.07 | 0.17 | 10.3 | 39.5 | 9.8 |
| 3 | 238 | 1.36 | 0.24 | 13.1 | 50.7 | 13.9 |
| 4 | 273 | 1.53 | 0.29 | 12.9 | 57.1 | 16.9 |
| 5 | 296 | 1.61 | 0.33 | 14.3 | 60.0 | 17.2 |
| 6 | 316 | 1.69 | 0.37 | 14.2 | 65.0 | 21.5 |
| 7 | 337 | 1.75 | 0.41 | 15.2 | 65.3 | 23.8 |
| 8 | 352 | 1.80 | 0.44 | 15.3 | 67.2 | 25.6 |
| 9 | 368 | 1.84 | 0.47 | 15.9 | 68.6 | 27.3 |
| 10 | 376 | 1.86 | 0.49 | 16.0 | 69.4 | 28.5 |

Example V

Ten successive extractions were carried out according to the procedure described in Example IV on a neutralized synthetic hydrocarbon liquid initially measuring four liters and containing 0.53 mole per liter of alcohols, 0.51 mole per liter of carbonyl compounds, and 85 volume-percent of hydrocarbons. The aqueous extractant solution initially measured one liter and contained 25 weight-percent of salts of a $C_5$ acid fraction isolated from the raw synthetic hydrocarbon liquid. The extractions were carried out at 38° C. The results were as follows:

| Extraction No. | Cumulative Extracted Material | | | | Cumulative Recovery | |
|---|---|---|---|---|---|---|
| | Volume, ml. | Alcohols, moles | Carbonyls, moles | Hydrocarbons, vol.-percent | Alcohols, mole-percent | Carbonyls, mole-percent |
| 1 | 25 | 0.27 | 0.09 | 7.0 | 12.7 | 4.4 |
| 2 | 46 | | | 7.0 | | |
| 3 | 61 | 0.36 | 0.12 | 7.7 | 17.0 | 5.9 |
| 4 | 74 | 0.43 | 0.14 | 7.8 | 20.3 | 6.8 |
| 5 | 85 | 0.49 | 0.16 | 7.9 | 23.1 | 7.8 |
| 6 | 94 | 0.54 | 0.18 | 8.0 | 25.5 | 8.8 |
| 7 | 102 | 0.58 | 0.20 | 8.0 | 27.4 | 9.8 |
| 8 | 108 | 0.61 | 0.21 | 8.0 | 28.8 | 10.3 |
| 9 | 115 | 0.64 | 0.23 | 8.3 | 30.2 | 11.3 |
| 10 | 122 | 0.67 | 0.24 | 8.5 | 31.6 | 11.8 |

Example VI

Ten successive extractions were carried out according to the procedure described in Example IV on a neutralized synthetic hydrocarbon liquid initially measuring four liters and containing 0.53 mole per liter of alcohols, 0.51 mole per liter of carbonyl compounds, and 85 volume-percent of hydrocarbons. The aqueous extractant solution initially measured one liter and contained 25 weight-percent of salts of a $C_6$ acid fraction isolated from the raw synthetic hydrocarbon liquid. The extractions were carried out at 38° C. The results were as follows:

| Extraction No. | Cumulative Extracted Material | | | | Cumulative Recovery | |
|---|---|---|---|---|---|---|
| | Volume, ml. | Alcohols, moles | Carbonyls, moles | Hydrocarbons, vol.-percent | Alcohols, mole-percent | Carbonyls, mole-percent |
| 1 | 107 | 0.57 | 0.16 | 16.0 | 26.9 | 7.8 |
| 2 | | | | | | |
| 3 | 132 | 0.70 | 0.21 | 14.7 | 33.0 | 10.3 |
| 4 | 155 | 0.82 | 0.26 | 14.4 | 38.7 | 12.7 |
| 5 | 178 | 0.92 | 0.32 | 14.0 | 43.4 | 15.7 |
| 6 | 195 | 0.99 | 0.36 | 13.7 | 46.6 | 17.6 |
| 7 | 211 | 1.06 | 0.40 | 13.6 | 50.0 | 19.6 |
| 8 | 225 | 1.10 | 0.43 | 13.5 | 51.9 | 21.1 |
| 9 | 237 | 1.14 | 0.46 | 13.4 | 53.8 | 22.5 |
| 10 | 247 | 1.17 | 0.59 | 13.3 | 55.2 | 24.0 |

Example VII

Seven aqueous extractant solutions were prepared, each containing 25 percent by weight of solubilizer. In six of the solutions, the solubilizer was the sodium salt of a single acid chosen from the group of n-alkanoic acids having 4, 6, 8, 9, 10, and 12 carbon atoms in the molecule. The solubilizer in the seventh extractant solution was the sodium salts of the total acids from a synthetically produced mixture of hydrocarbons and organic oxygenated compounds, obtained by the hydrogenation of carbon monoxide in the presence of a fluidized, alkali-promoted iron catalyst.

A series of tests were then carried out. In each test, a fresh four-liter portion of caustic-washed synthetic hydrocarbon solution, containing 0.64 mole of alcohols per liter, 0.26 mole of carbonyl compounds per liter, and 76 percent by volume of hydrocarbons, was contacted at 38° C. with one liter of one of the extractant solutions. The aqueous extracts were then separated and steam-distilled, and the liberated organic materials were analyzed, with the following results:

| Solubilizer Salt | Extract | | | | Recovery | |
|---|---|---|---|---|---|---|
| | Volume, ml. | Alcohols, moles | Carbonyls, moles | Hydrocarbons, vol.-percent | Alcohols, mole-percent | Carbonyls, mole-percent |
| Butyrate ($C_4$) | 9.1 | 0.057 | 0.008 | 11.5 | 2.2 | 0.9 |
| Caproate ($C_6$) | 77.0 | 0.455 | 0.050 | 8.0 | 17.8 | 5.3 |
| Caprylate ($C_8$) | 205.5 | 0.721 | 0.088 | 38.5 | 28.1 | 9.4 |
| Pelargonate ($C_9$) | 246.0 | 0.785 | 0.127 | 46.0 | 30.7 | 13.5 |
| Caprate ($C_{10}$) | 337.5 | 0.847 | 0.088 | 60.0 | 33.1 | 9.4 |
| Laurate ($C_{12}$) | 906.5 | 1.142 | 0.218 | 77.0 | 44.6 | 23.2 |
| Total Salts from Charging Stock | 169.0 | 0.595 | 0.073 | 38.0 | 23.2 | 7.8 |

Example VIII

A solution of organic oxygenated compounds in hydrocarbons, prepared by the hydrogenation of carbon monoxide in the presence of a fluidized, alkali-promoted iron catalyst, was washed free of organic acids with an aqueous solution of sodium hydroxide. The resulting aqueous solution of sodium salts was steam-stripped free from organic materials other than the sodium salts, and the stripped organic materials were returned to the caustic-washed hydrocarbon solution. A portion of the stripped aqueous salt solution was then concentrated to give an extractant solution containing approximately 45 percent by weight of the sodium salts. The caustic-washed hydrocarbon solution was thereafter extracted at room temperature with the 45 percent extractant solution, and from the resulting aqueous extract was distilled an organic mixture containing 3.23 moles of alcohols per liter, 1.10 moles of carbonyl compounds per liter, and 44 percent by volume of hydrocarbons. This material will be referred to hereinafter as the "primary extract."

Another portion of the stripped aqueous salt solution was treated with sulphuric acid to liberate the organic acids, and the liberated acids were fractionally distilled to separate $C_4$, $C_5$, $C_6$, $C_7$, and $C_8$ acid fractions. Each of these fractions was subsequently converted into the corresponding sodium salts, which were thereupon dissolved in water to form a series of extractant solutions, each containing 25 percent by weight of the salts prepared from a single acid fraction. A series of extractions were then carried out with each extractant solution. In each series, a 500-milliliter portion of the extractant solution was used at approximately 38° C. to treat a quantity of the primary extract initially measuring one liter. The resulting aqueous extract was separated and exhaustively steam distilled, the organic material separated therefrom was analyzed, and the stripped extractant solution was again used to extract the raffinate phase. The results were as follows:

| Solubilizer Salt | Extraction No. | Cumulative Extracted Material | | | | Cumulative Recovery | |
|---|---|---|---|---|---|---|---|
| | | Volume, ml. | Alcohols, moles | Carbonyls, moles | Hydrocarbons, volume-percent | Alcohols, mole-percent | Carbonyls, mole-percent |
| $C_4$ | 1 | 31 | 0.20 | 0.02 | 0.0 | 6.2 | 1.9 |
| $C_5$ | 1 | 123 | 0.80 | 0.17 | 10.5 | 24.8 | 15.5 |
| | 2 | 201 | 1.30 | 0.29 | 9.3 | 40.2 | 26.4 |
| | 3 | 261 | 1.67 | 0.37 | 8.7 | 51.7 | 33.6 |
| | 4 | 305 | 1.94 | 0.43 | 8.1 | 60.0 | 39.1 |
| | 5 | 329 | 2.08 | 0.47 | 7.8 | 64.4 | 42.7 |
| | 6 | 351 | 2.21 | 0.50 | 7.6 | 68.4 | 45.5 |
| $C_6$ | 1 | 230 | 1.24 | 0.29 | 19.0 | 38.4 | 26.3 |
| | 2 | 374 | 2.02 | 0.45 | 18.2 | 62.5 | 41.8 |
| | 3 | 458 | 2.46 | 0.57 | 17.7 | 76.2 | 51.8 |
| | 4 | 507 | 2.71 | 0.64 | 17.0 | 83.9 | 58.2 |
| | 5 | 531 | 2.82 | 0.68 | 16.5 | 87.3 | 61.8 |
| $C_7$ | 1 | 340 | 1.62 | 0.41 | 28.5 | 50.1 | 37.3 |
| | 2 | 515 | 2.44 | 0.63 | 27.8 | 75.5 | 57.3 |
| | 3 | 598 | 2.81 | 0.75 | 26.8 | 87.0 | 68.2 |
| | 4 | 631 | 2.94 | 0.81 | 25.9 | 91.0 | 73.6 |
| $C_8$ | 1 | 480 | 1.96 | 0.47 | 35.5 | 60.7 | 42.7 |
| | 2 | 682 | 2.74 | 0.67 | 35.6 | 84.8 | 60.9 |
| | 3 | 744 | 2.95 | 0.77 | 35.3 | 91.3 | 70.0 |

The organic material that was recovered by steam-distillation from the $C_6$-salt aqueous extract, described above, was separated by fractional distillation into three fractions, and the fractions were analyzed. The lowest-boiling fraction was found to contain most of the hydrocarbon contaminants:

| Fraction No. | Boiling Range, ° C. | Proportion of Steam-Distilled Organic Material, vol. percent | Hydrocarbons in Fraction, vol. percent |
|---|---|---|---|
| 1 | up to 93 | 31.1 | 59.0 |
| 2 | 93–190 | 58.5 | 7.5 |
| 3 | 190 | 10.4 | 0.0 |

While the foregoing examples illustrate advantageous embodiments of my invention, it is to be understood that I am not limited to the charging stocks, process materials, apparatus, manipulative techniques, and operating conditions described therein. My invention is suitable in general for the processing of hydrocarbon solutions of organic oxygenated compounds such as alcohols, aldehydes, and ketones, and for this purpose the broad class of water-soluble salts of my defined class of carboxylic acids is operative, suitable, and useful. It is further to be understood that any modifications in my process or equivalents thereof that would ordinarily occur to one skilled in the art are to be considered as lying within the scope of my invention.

This application is a continuation-in-part of my previous application Serial No. 78,504, filed February 26, 1949, now abandoned.

In accordance with the foregoing description, I claim as my invention:

1. In a process for separating a preferentially oil-soluble organic oxygenated compound selected from the group consisting of alcohols, aldehydes, and ketones from a hydrocarbon solution thereof, the steps which comprise contacting said solution with an aqueous extractant solution of a solubilizer consisting essentially of salts of a mixture of organic acids selected from the group consisting of aliphatic monocarboxylic acids having from four to six carbon atoms in the molecule, and stratifying and separating an aqueous extract containing said preferentially oil-soluble organic oxygenated compound in purified form.

2. In a process for separating a preferentially oil-soluble organic oxygenated compound selected from the group consisting of alcohols, aldehydes, and ketones from a hydrocarbon solution thereof, the steps which comprise contacting said solution with an aqueous extractant solution of a solubilizer consisting essentially of salts of a mixture $C_2$–$C_6$ aliphatic monocarboxylic acids predominating in $C_4$–$C_6$ acids, and stratifying and separating an aqueous extract containing said preferentially oil-soluble organic oxygenated compound in purified form.

3. In a process for separating a preferentially oil-soluble organic oxygenated compound selected from the group consisting of alcohols, aldehydes, and ketones from a hydrocarbon solution thereof, the steps which comprise contacting said solution with an aqueous extractant solution of a solubilizer consisting essentially of salts of a mixture of aliphatic monocarboxylic acids predominating in $C_4$–$C_6$ acids wherein said mixture of acids has an average molecular weight between about 85 and 116, and stratifying and separating an aqueous extract containing said preferentially oil-soluble organic oxygenated compound in purified form.

4. In a process of separating a preferentially oil-soluble organic oxygenated compound selected from the group consisting of alcohols, aldehydes, and ketones from a hydrocarbon solution thereof, the steps which comprise contacting said solution with an aqueous extractant solution of a solubilizer consisting essentially of salts of a mixture of aliphatic monocarboxylic acids predominating in $C_4$–$C_6$ acids wherein said mixture of acids has an average molecular weight between about 95 and 105, and stratifying and separating an aqueous extract containing said preferentially oil-soluble organic oxygenated compound in purified form.

5. In a process of separating a preferentially oil-soluble organic oxygenated compound selected from the group consisting of alcohols, aldehydes, and ketones from a hydrocarbon solution thereof, the steps which comprise contacting said solution with an aqueous extractant solution of a solubilizer consisting essentially of salts of a mixture of alkanoic acids boiling between about 150 and 210° C. at one atmosphere, and stratifying and separating an aqueous extract containing said preferentially oil-soluble organic oxygenated compound in purified form.

6. In a process for purifying a hydrocarbon phase obtained in the hydrogenation of carbon monoxide over an alkali-promoted iron catalyst, said hydrocarbon phase containing preferentially oil-soluble organic oxygenated compounds, the steps which comprise separating organic acids from said hydrocarbon phase, separating from said acids a $C_2$–$C_6$ acid fraction predominating in $C_4$–$C_6$ acids, converting said acid fraction into water-soluble salts, and extracting organic oxygenated compounds from said hydrocarbon phase with an aqueous solution of said water-soluble salts.

7. In a process for purifying a hydrocarbon mixture obtained in the oxidation of normally liquid hydrocarbons, said hydrocarbon mixture containing $C_4$–$C_6$ aliphatic monocarboxylic acids and other preferentially oil-soluble organic oxygenated compounds, the steps which comprise separating organic acids from said hydrocarbon mixture, separating from said acids a fraction thereof having fewer than seven carbon atoms in the molecule and predominating in $C_4$–$C_6$ acids, converting said acid fraction into water-soluble salts, and extracting organic oxygenated compounds from said hydrocarbon mixture with an aqueous solution of said water-soluble salts.

8. In a process for separating a preferentially oil-soluble organic oxygenated compound selected from the group consisting of alcohols, aldehydes, and ketones, from a hydrocarbon solution thereof, the steps which comprise extracting said organic oxygenated compound from said hydrocarbon solution with an aqueous extractant solution containing a substantially non-surface-active salt of a preferentially oil-soluble carboxylic acid; separating from the resulting aqueous extract a mixture of hydrocarbons and said organic oxygenated compound; contacting said separated mixture with an aqueous extractant solution of a solubilizer consisting essentially of a salt of an organic acid selected from the group consisting of aliphatic monocarboxylic acids having from four to six carbon atoms in the molecule; stratifying and separating an aqueous extract phase; and recovering from said aqueous extract phase said organic oxygenated compound in purified form.

References Cited in the file of this patent

UNITED STATES PATENTS

| | | |
|---|---|---|
| 1,995,324 | Penniman | Mar. 26, 1935 |
| 2,258,500 | Mertens | Oct. 7, 1941 |
| 2,274,750 | Soenksen et al. | Mar. 3, 1942 |
| 2,288,769 | Alleman et al. | July 7, 1942 |
| 2,535,070 | Walker et al. | Dec. 26, 1950 |
| 2,568,517 | Sharp et al. | Sept. 18, 1951 |
| 2,645,655 | Pearce | July 14, 1953 |

OTHER REFERENCES

Fischer, Conversion of Coal into Oils, Pub. by Ernest Benn, Ltd. London (1925).

Koch, Bunnstaff-Chemie, vol. 16, No. 20, pages 382–7 (1935).

Fieser et al., Organic Chemistry, Pub. by Heath, Boston, 1944, pp. 206–9.

U. S. Naval Tech. Missions in Europe, Oct. 1945, pages 1, 73, and 80–88.